(12) United States Patent
Endo et al.

(10) Patent No.: US 11,139,766 B2
(45) Date of Patent: Oct. 5, 2021

(54) CONTROLLER, MOTOR CONTROL SYSTEM HAVING THE CONTROLLER, AND ELECTRIC POWER STEERING SYSTEM HAVING THE MOTOR CONTROL SYSTEM

(71) Applicants: NIDEC CORPORATION, Kyoto (JP); NIDEC ELESYS CORPORATION, Kanagawa (JP)

(72) Inventors: Shuji Endo, Kyoto (JP); Hajime Nakane, Kanagawa (JP); Takuya Yokozuka, Kanagawa (JP); Mikio Morishima, Kyoto (JP); Tokuji Tatewaki, Kanagawa (JP)

(73) Assignees: NIDEC CORPORATION, Kyoto (JP); NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 16/770,179

(22) PCT Filed: Nov. 22, 2018

(86) PCT No.: PCT/JP2018/043211
§ 371 (c)(1),
(2) Date: Jun. 5, 2020

(87) PCT Pub. No.: WO2019/111729
PCT Pub. Date: Jun. 13, 2019

(65) Prior Publication Data
US 2021/0006189 A1    Jan. 7, 2021

(30) Foreign Application Priority Data
Dec. 6, 2017    (JP) .............................. JP2017-234682

(51) Int. Cl.
*H02P 21/08*    (2016.01)
*H02P 21/22*    (2016.01)
(Continued)

(52) U.S. Cl.
CPC ............ *H02P 21/08* (2013.01); *B62D 5/0463* (2013.01); *G05B 11/36* (2013.01); *H02P 21/13* (2013.01);
(Continued)

(58) Field of Classification Search
CPC ........... H02P 21/08; H02P 21/22; G05B 11/36
(Continued)

(56) References Cited

U.S. PATENT DOCUMENTS 8,106,620 B2 *    1/2012    Kitanaka ................. H02P 21/05
                                                                318/807

FOREIGN PATENT DOCUMENTS

JP        2010252492 A    11/2010
JP        2013118817 A    6/2013
JP         201734760 A    2/2017

OTHER PUBLICATIONS

International Search Report in PCT/JP2018/043211, dated Feb. 26, 2019. 2pp.

* cited by examiner

*Primary Examiner* — David Luo
(74) *Attorney, Agent, or Firm* — Hauptman Ham, LLP

(57) ABSTRACT

A technique for reducing an operation noise even when a high-pass filter is used for controlling a motor is provided. A controller is used in a motor control system for driving a motor by using a drive circuit and an inverter. The controller includes a current control block. The controller performs feedforward control by using a current value, compensates for a term of a self-inductance of the motor included in a current control block by an inverse model, compensates for a phase characteristic of a transfer function of the inverse model by an advance component, and corrects a gain characteristic of the transfer function of the inverse model by a function of a physical quantity obtained based on an angular (Continued)

velocity of the motor, thereby compensating for a phase delay and a gain reduction of a torque output generated by the self-inductance.

7 Claims, 6 Drawing Sheets

(51) Int. Cl.
*B62D 5/04* (2006.01)
*G05B 11/36* (2006.01)
*H02P 21/13* (2006.01)
*H02P 27/12* (2006.01)
*B62D 6/08* (2006.01)

(52) U.S. Cl.
CPC .............. *H02P 21/22* (2016.02); *H02P 27/12* (2013.01); *B62D 5/0409* (2013.01); *B62D 6/08* (2013.01)

(58) Field of Classification Search
USPC ............................... 318/400.02, 400.01, 700
See application file for complete search history.

CONTROLLER, MOTOR CONTROL
SYSTEM HAVING THE CONTROLLER, AND
ELECTRIC POWER STEERING SYSTEM
HAVING THE MOTOR CONTROL SYSTEM

CROSS-REFERENCE TO RELATED
APPLICATIONS

This is the U.S. national stage of application No. PCT/JP2018/043211, filed on Nov. 22, 2018, and the present invention claims priority under 35 U.S.C. § 119 to Japanese Application No. 2017-234682 filed on Dec. 6, 2017.

FIELD OF THE INVENTION

The present disclosure relates to a controller, a motor control system having the controller, and an electric power steering system having the motor control system.

BACKGROUND

Japanese Unexamined Patent Application Publication No. 2017-034760 discloses a technique for controlling by using an inverse model of a feedforward technique has been known.

In motor current control of an electric power steering, feedback control is commonly used. However, when the feedback control is performed, there is a problem that an unpleasant motor operation noise is generated in response to a noise included in a current detector. In order to suppress the generation of the unpleasant motor operation noise, a method which does not directly use a current detection value, is conceivable. However, when the current detection value is not directly used, there is a problem that motor output torque varies due to parameter variations of the motor and motor drive circuit characteristics in the existing feedforward control technique.

In the existing technique described above, a d-axis actual current, a q-axis actual current, and a zero-phase actual current are passed through a high-pass filter. However, when the high-pass filter is used, sensitivity of a torque command value noise is increased, so that the motor operation noise is increased.

SUMMARY

An exemplary controller of the present disclosure is a controller used in a motor control system for driving a motor by using a drive circuit and an inverter, and includes a current control block, in which feedforward control based on a current value is performed, a term of a self-inductance of the motor included in the current control block is compensated by an inverse model, further a phase characteristic of a transfer function of the inverse model is compensated by an advance component, and a phase delay and a gain reduction of a torque output generated by the self-inductance is compensated by correcting a gain characteristic of the transfer function of the inverse model by a function of a physical quantity obtained based on an angular velocity of the motor.

Advantageous Effects of Invention

According to an exemplary embodiment of the present disclosure, feedforward control based on a current value is performed, and a term of a self-inductance of a motor included in a current control block is compensated by an inverse model. In addition, a phase characteristic of a transfer function of the inverse model is compensated by an advance component, and a gain characteristic is corrected by a function of a physical quantity obtained based on an angular velocity of the motor. Since a phase delay and a gain reduction of a torque output caused by the self-inductance can be compensated, even when a high-pass filter is used for controlling the motor, an operation noise can be reduced.

DETAILED DESCRIPTION

Hereinafter, embodiments of a controller, a motor control system having the controller, and an electric power steering system having the motor control system of the present disclosure will be described in detail with reference to the accompanying drawings. However, in order to avoid the following description from being unnecessarily redundant and to facilitate understanding of those skilled in the art, an unnecessary detailed description may be omitted. For example, a detailed description of the matters already well known and a duplicate description of substantially the same configuration may be omitted.

In the embodiments and modifications of the present disclosure, a configuration for achieving the purpose described in each of the following items will be described. An outline of the configuration will also be described.

(1) Reduction of Motor Current Detection Noise Sensitivity

A feedforward (FF) type is applied as basic control. In the embodiment, feedback (FB) control using a current detection value is not performed. Parameter variations which cause a problem with the FF type control is corrected by an observer using a current value. Combining with three-phase independent control produces the effect described above.

(2) Reduction of Torque Command Value Noise Sensitivity

In performing the FF type control, a motor self-inductance is compensated by an inverse model. In this case, a high-pass filter increases the noise sensitivity. In fact, there may be cases where a motor operation noise increases due to a noise sensitivity problem. The present inventor has created a method for reducing such noise sensitivity.

(3) Compensation of a Drive System Non-Linear Element

The non-linear element having the largest influence on the operation noise is a dead band of a drive circuit. The dead band occurs when the current crosses zero. The present inventor estimates a timing at which the current crosses zero, and performs dead band compensation using the estimation result.

Hereinafter, the embodiments of the present disclosure will be described.

A current controller capable of reducing the motor current detection noise sensitivity will be described below.

Figure 1:
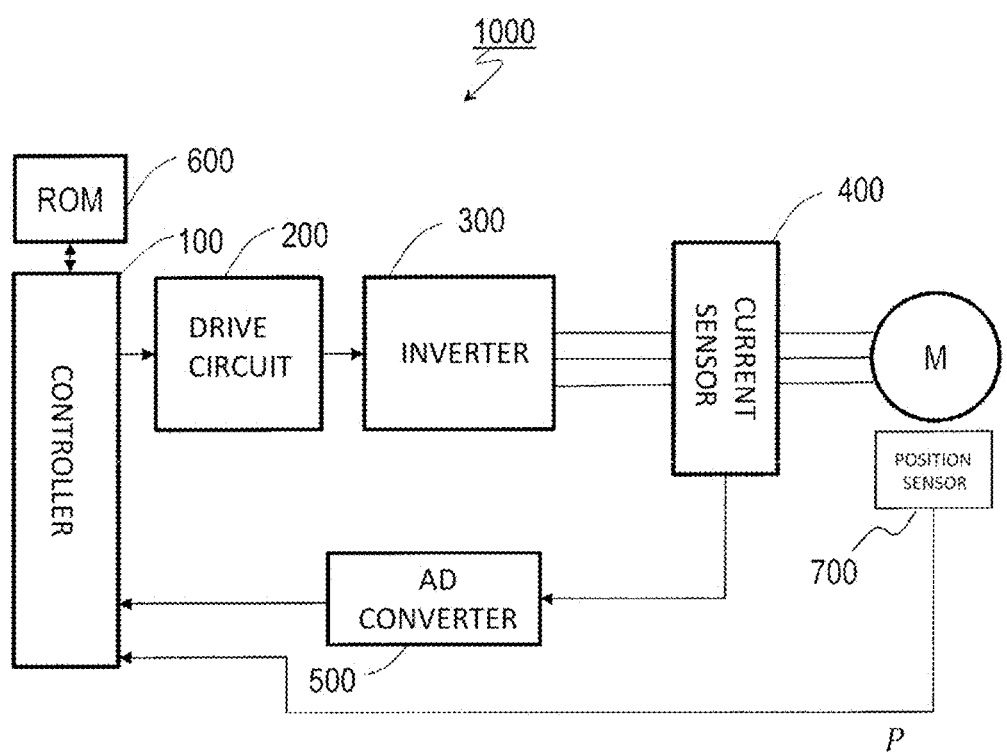
FIG. 1 is a schematic diagram of a hardware block of a motor control system 1000 according to an exemplary embodiment of the present disclosure.

FIG. 1 schematically illustrates a hardware block of a motor control system 1000 according to an exemplary embodiment of the present disclosure.

The motor control system 1000 typically includes a motor M, a controller (control circuit) 100, a drive circuit 200, an inverter (also referred to as an "inverter circuit") 300, a plurality of current sensors 400, an analog/digital conversion circuit (hereinafter referred to as an "AD converter") 500, a Read Only Memory (ROM) 600, and a position sensor 700. The motor control system 1000 is modularized and manufactured, for example, as a motor module having a motor, a sensor, a driver, and a controller. In the description, the motor control system 1000 will be described by taking an example of a system having the motor M as a constituent element. However, the motor control system 1000 may be a system for driving the motor M, which does not include the motor M as a constituent element.

The motor M is a surface permanent magnet type (SPM) motor, and is, for example, a surface permanent magnet type synchronous motor (SPMSM). The motor M includes, for example, three-phase (U-phase, V-phase, and W-phase) windings (not illustrated). The three-phase windings are electrically connected to the inverter 300. The present disclosure is not limited to the three-phase motors, but also includes multi-phase motors such as five-phase, seven-phase motors and the like. In the description, the embodiment of the present disclosure will be described using a motor control system that controls the three-phase motor as an example. As the motor M, a motor having a relatively small mutual inductance between phases, for example, a motor having 10 poles and 12 slots, and a motor having 14 poles and 12 slots may be used.

The controller 100 is, for example, a micro control unit (MCU). The controller 100 controls the entire motor control system 1000 and controls torque and a rotational speed of the motor M by, for example, vector control. The motor M can be controlled not only by the vector control but also by other closed loop control. The rotational speed is represented by a rotational speed (rpm) at which a rotor rotates per unit time (for example, per one minute) or a rotational speed (rps) at which the rotor rotates per unit time (for example, per one second). The vector control is a method of decomposing a current flowing through a motor into a current component contributing to generation of torque and a current component contributing to generation of magnetic flux, and independently controlling each current component orthogonal to each other. The controller 100 sets target current values according to, for example, actual current values measured by the plurality of current sensors 400, a rotor angle estimated based on the actual current values, and the like. The controller 100 generates Pulse Width Modulation (PWM) signals based on the target current values, and outputs the PWM signals to the drive circuit 200.

The drive circuit 200 is, for example, a gate driver. The drive circuit 200 generates control signals for controlling switching operation of switching elements in the inverter 300 according to the PWM signals output from the controller 100. The drive circuit 200 may be mounted on the controller 100.

The inverter 300 converts DC power supplied from, for example, a DC power supply (not illustrated) into AC power, and drives the motor M with the converted AC power. For example, the inverter 300 converts the DC power into three-phase AC power, which is a pseudo sine wave of the U-phase, the V-phase, and the W-phase, based on the control signals output from the drive circuit 200. The motor M is driven by the converted three-phase AC power.

The plurality of current sensors 400 includes at least two current sensors that detect at least two currents among the currents flowing through the U-phase, V-phase, and W-phase windings of the motor M. In the present embodiment, the plurality of current sensors 400 includes two current sensors 400A and 400B (see FIG. 2) for detecting currents flowing through the U-phase and the V-phase. Naturally, the plurality of current sensors 400 may have three current sensors that detect three currents flowing through the U-phase, V-phase, and W-phase windings, or, for example, may have two current sensors that detect currents flowing through the V-phase and W-phase, or currents flowing through the W-phase and U-phase. The current sensor includes, for example, a shunt resistor and a current detection circuit (not illustrated) for detecting a current flowing through the shunt resistor. The resistance value of the shunt resistor is, for example, about 0.1Ω.

The AD converter 500 samples analog signals output from the plurality of current sensors 400, converts the analog signals into digital signals, and outputs the converted digital signals to the controller 100. The controller 100 may perform AD conversion. In this case, the controller 100 receives the detected current signals (analog signals) directly from the plurality of current sensors 400.

The ROM 600 is, for example, a writable memory (for example, PROM), a rewritable memory (for example, flash memory), or a read-only memory. The ROM 600 stores a control program having a command group for causing the controller 100 to control the motor M. For example, the control program is temporarily loaded on a RAM (not illustrated) at the time of booting. The ROM 600 does not need to be externally attached to the controller 100, and may be mounted on the controller 100. The controller 100 on which the ROM 600 is mounted may be, for example, the MCU described above.

The position sensor 700 is, the position sensor 700 is disposed on the motor M, detects the rotor angle P, and outputs the detected rotor angle P to the controller 100. The position sensor 700 may be implemented by, for example, a combination of a magnetoresistive (MR) sensor having an MR element and a sensor magnet. The position sensor 700 may be also implemented by using, for example, a Hall IC including a Hall element or a resolver.

In the exemplary embodiment, the controller 100 is implemented by a field programmable gate array (FPGA) with an incorporated CPU core. In the FPGA hardware logic circuit, an observer block, a current control block, and a vector control operation block, which will be described later, are constructed. For example, the CPU core calculates a torque command value by software processing. Each block in the FPGA generates a PWM signal using the torque command value ($T_{ref}$) received from the CPU core and a rotor rotational position of the motor M measured by the position sensor 700, that is, the rotor angle (P), a current measurement value ($I_a$, $I_b$, $I_c$) received from the AD converter 500, and the like.

In FIG. 1, the inverter 300 is configured by one system, but may be configured by a plurality of systems, for example, two systems. Even with the plurality of systems, a controller having the same or equivalent function and configuration as the controller 100 may be employed for each of the plurality of systems, or a different controller may be employed.

Each constituent element configuring the motor control system 1000 illustrated in FIG. 1, for example, the motor M, the controller 100, the drive circuit 200, the inverter 300, and the like may be integrally housed in a housing (not illustrated). Such a configuration is manufactured and sold as a so-called "mechanically/electrically integrated motor". In the mechanically/electrically integrated motor, since the various constituent elements are housed in the housing, there is no need to design an arrangement of each constituent element, an installation space, and a wiring layout. As a result, space saving of the motor and its peripheral circuit, and simplification of the design can be realized. The controller 100 according to the present embodiment can suppress the operation noise generated by the rotation of the motor M by using a feedforward control technique described later. By integrating the controller 100 and the motor M, it is possible to provide a space-saving and low-noise "mechanically/electrically integrated motor". The "mechanically/electrically integrated motor" may further include the current sensor 400, the converter 500, and the ROM 600.

Figure 2:
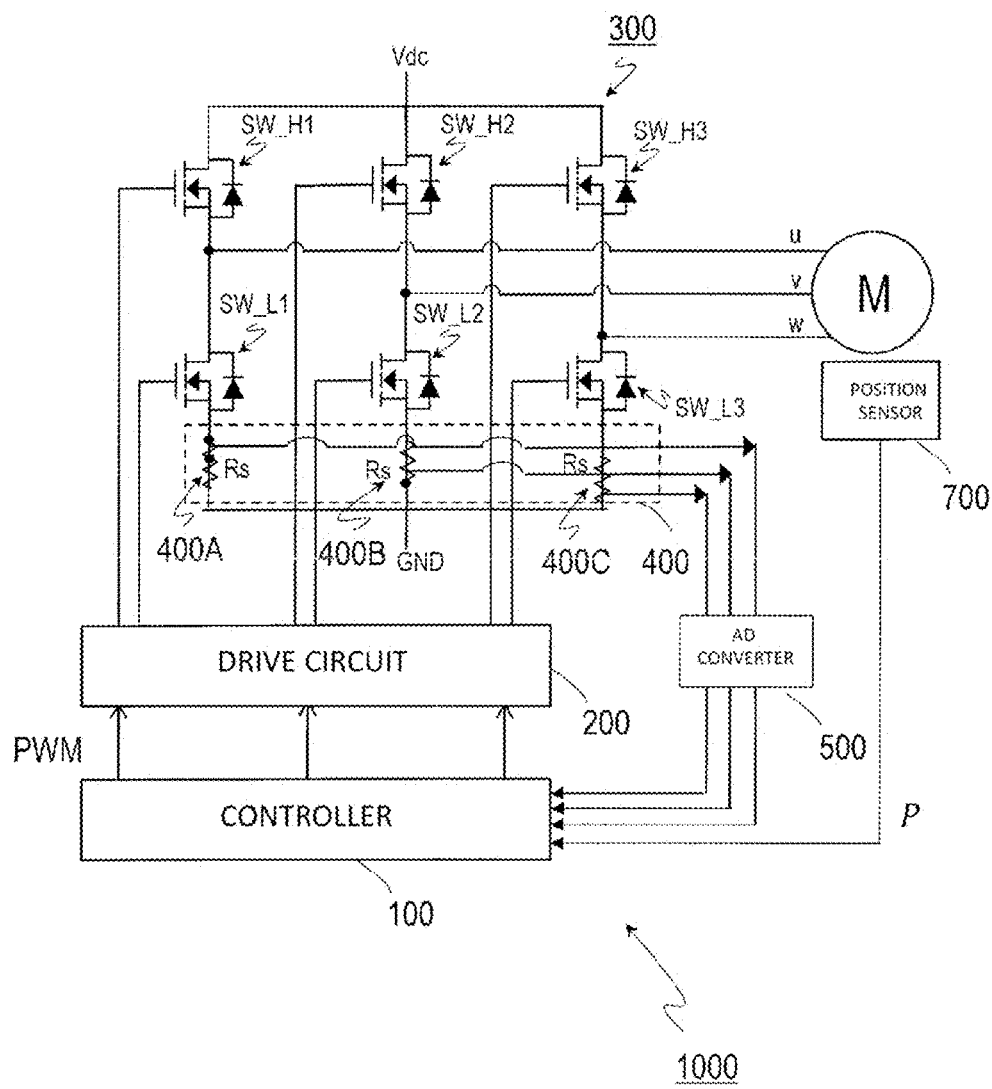
FIG. 2 schematically illustrates a hardware configuration of an inverter 300 in the motor control system 1000 according to the present embodiment.

With reference to FIG. 2, a hardware configuration of the inverter 300 will be described in detail.

FIG. 2 schematically illustrates the hardware configuration of the inverter 300 in the motor control system 1000 according to the present embodiment.

The inverter 300 includes three low-side switching elements and three high-side switching elements. Illustrated switching elements SW_L1, SW_L2, and SW_L3 are low-side switching elements, and switching elements SW_H1, SW_H2, and SW_H3 are high-side switching elements. As the switching element, for example, a semiconductor switching element such as a field effect transistor (FET, typically MOSFET), an insulated gate bipolar transistor (IGBT), or the like can be used. The switching element includes a reflux diode for flowing a regenerative current flowing toward the motor M.

FIG. 2 illustrates shunt resistors Rs of three current sensors 400A, 400B, and 400C for detecting currents flowing through the U-phase, V-phase, and W-phase. As illustrated, for example, the shunt resistor Rs may be electrically connected between the low-side switching element and the ground. Alternatively, for example, the shunt resistor Rs may be electrically connected between the high-side switching element and a power supply.

The controller 100 can drive the motor M by performing, for example, control by three-phase energization (hereinafter, referred to as "three-phase energization control") based on the vector control. For example, the controller 100 generates PWM signals for performing the three-phase energization control, and outputs the PWM signals to the drive circuit 200. The drive circuit 200 generates a gate control signal for controlling the switching operation of each FET in the inverter 300 based on the PWM signal, and supplies the gate control signal to the gate of each FET.

Although three current sensors 400A, 400B, and 400C are provided in FIG. 2, the number of current sensors may be two. For example, the current sensor 400C for detecting the current flowing through the W-phase can be omitted. In this case, the current flowing through the W-phase may be detected by calculation instead of measurement. In the three-phase energization control, the sum of the currents flowing through respective phases becomes ideally zero. When the currents flowing through the U-phase and V-phase are detected by the current sensors 400A and 400B, respectively, a value obtained by inverting a sign of the sum of the U-phase current and the V-phase current can be calculated as the current value flowing through the W-phase.

According to the present disclosure, three current sensors may be provided to detect the current flowing through each of the three phases, or two current sensors may be provided to detect the currents in the two phases and the current flowing through the remaining one phase may be calculated by performing the above-described calculation.

Figure 3:
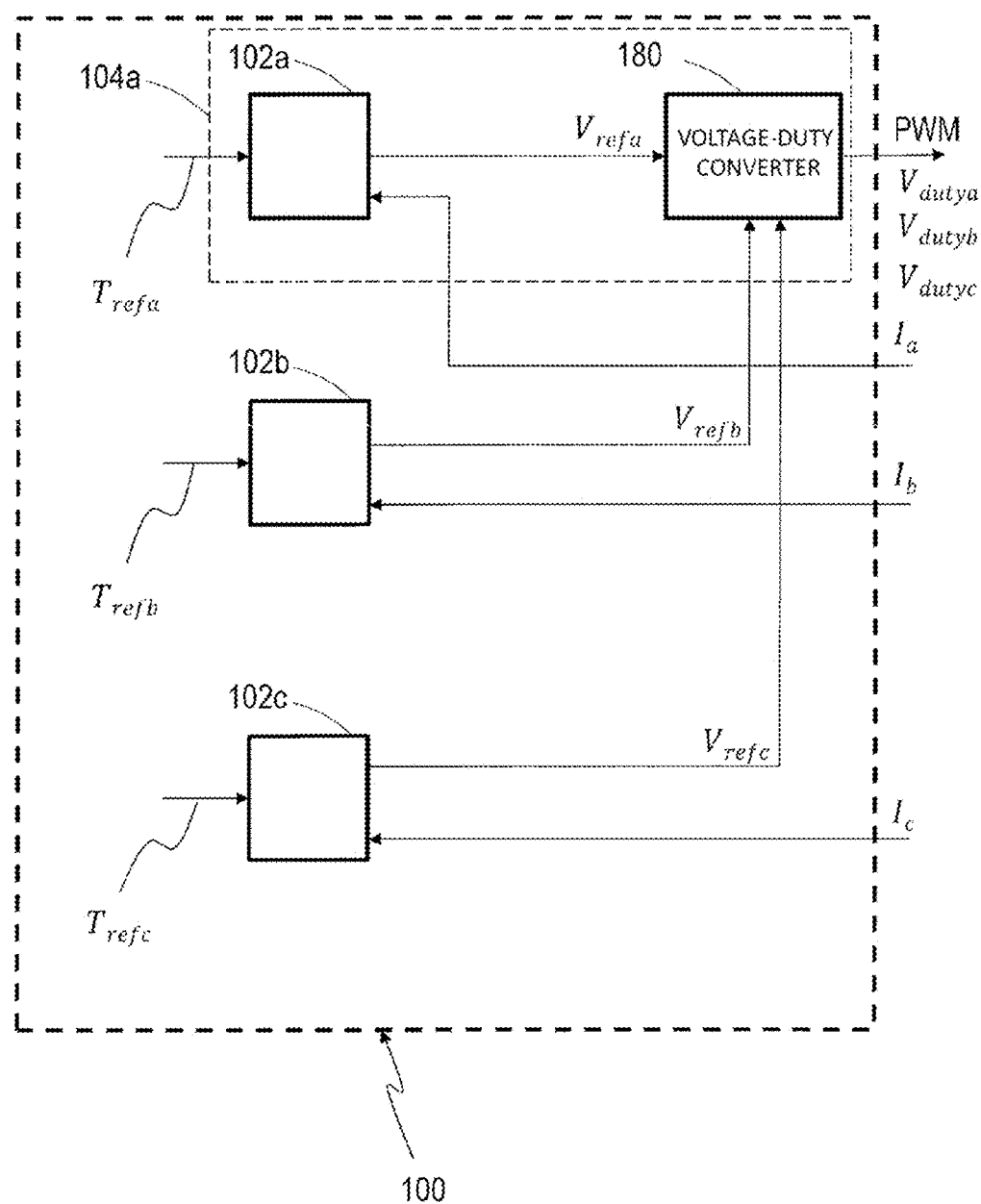
FIG. 3 is a block diagram illustrating an internal configuration of a controller 100.

FIG. 3 is a block diagram illustrating an internal configuration of the controller 100. The controller 100 includes current controllers 102a, 102b, and 102c, and a voltage-duty converter 180. The current controller 102a receives a torque command value $T_{refa}$ and a U-phase current value $I_a$, and outputs a command voltage $V_{refa}$. The current controller 102b receives a torque command value $T_{refb}$ and a U-phase current value $I_b$, and outputs a command voltage $V_{refb}$. The current controller 102c receives a torque command value $T_{refc}$ and a U-phase current value $I_c$, and outputs a command voltage $V_{refc}$.

In the description, a description will be given assuming that the three components $T_{refa}$, $T_{refb}$, and $T_{refc}$ of the torque command value $T_{ref}$ are given values. Each of these values is generated by, for example, a CPU core (not illustrated) of the controller 100. Since processing for generating the torque command value is well known, a description thereof will be omitted.

The voltage-duty converter 180 performs a voltage-duty conversion. The voltage-duty conversion is processing for generating a PWM signal from a command voltage. The PWM signal represents a voltage command value. Specifically, the voltage-duty converter 180 generates a PWM signal $V_{dutya}$ from the command voltage $V_{refa}$. Similarly, the voltage-duty converter 180 generates PWM signals $V_{dutyb}$ and $V_{dutyc}$ from the command voltages $V_{refb}$ and $V_{refc}$, respectively. Since the voltage-duty conversion is well known, a detailed description thereof will be omitted in the description.

Next, details of the current controllers 102a to 102c will be described. Hereinafter, a U-phase processing circuit 104a including the current controller 102a and the voltage-duty converter 180 will be described as an example. Since both the current controller 102b and the current controller 102c are the same, illustration and a description thereof are omitted.

Figure 4:
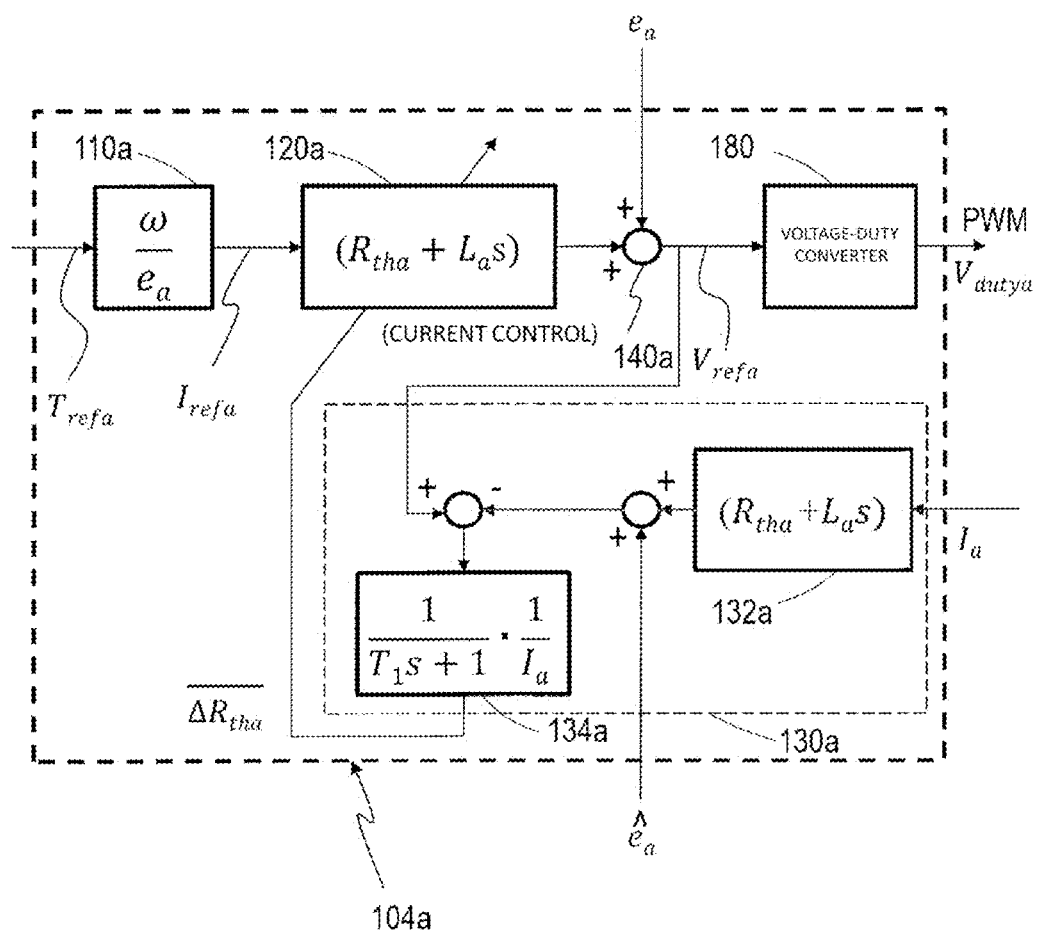
FIG. 4 is a control block diagram illustrating details of an exemplary U-phase processing circuit 104a of the present disclosure.

FIG. 4 is a control block diagram illustrating details of the U-phase processing circuit 104a. A portion excluding the voltage-duty converter 180 in the U-phase processing circuit 104a corresponds to the current controller 102a (FIG. 3).

The U-phase processing circuit 104 includes a torque/current conversion block 110a, a current control block 120a, an adaptive control block 130a, and an adder 140a. The respective blocks and the adder represent arithmetic operations. Therefore, a "block" can also be read as an "operation". All operations may be implemented by the hardware logic of the FPGA, or one or more operations may be implemented by one or more arithmetic circuits.

The torque/current conversion block 110a converts the torque command value $T_{refa}$ into a current command value $I_{refa}$.

The current control block 120a and the adder 140a are operation blocks corresponding to an operation of a voltage equation to be described later. The current control block 120a functions as a high-pass filter. The current control block 120a sequentially corrects a resistance value $R_{tha}$ by a modeling error $\Delta R_{tha}$ calculated by the adaptive control block 130*a*. That is, a voltage value is obtained by using the previous resistance value $R_{tha}+\Delta R_{tha}$ as a new $R_{tha}$.

The adaptive control block 130*a* outputs the modeling error $\Delta R_{tha}$ by using the current value $I_a$ flowing through the U-phase. The adaptive control block 130*a* has a first operation block 132*a* that performs the same operation as the current control block 120*a*, and a second operation block 134*a*. Of these, the latter second operation block 134*a* functions as an "observer". Hereinafter, the second operation block 134*a* will be described as an "observer block 134*a*". As is apparent from the description of the observer block 134*a* in FIG. 4, the observer is a primary low-pass filter with a time constant $T_1$.

Note that the first operation block 132*a* includes a differential symbol "d/dt", and is represented in a time domain, while the observer block 134*a* is represented in an s domain using a variable "s". The reason for using the variable s is to clarify that the observer is the primary low-pass filter with the time constant $T_1$. It should be noted that it is for convenience of understanding.

A signal input to the adaptive control block 130*a* (signal to be filtered) is not a white noise but a colored noise. In the present embodiment, the adaptive control block 130*a* does not perform a filtering operation using the least squares method.

Hereinafter, before describing a meaning of each block illustrated in FIG. 4, how the operation corresponding to each block is derived will be described.

When the motor is rotating at an angular velocity ω, power injected into a coil is E·I, and power generated by the coil is T·ω. Where E is voltage, I is current, and T is torque.

According to the energy conservation law, a following equation (1) holds.

$$EI=T\omega \quad (1)$$

A following equation (2) is obtained by modifying the equation (1).

$$T=EI/\omega \quad (2)$$

The present inventor has considered to avoid using the current I because it contains much noise. When the current I is obtained from a voltage equation (equation (3)) and substituted into the equation (1), an equation (4) is obtained.

$$I=f(V) \quad (3)$$

$$T=(E/\omega)f(V) \quad (4)$$

Here, the voltage equation is shown in a following equation (5).

$$\begin{bmatrix} v_a \\ v_b \\ v_c \end{bmatrix} = R_{th}\begin{bmatrix} i_a \\ i_b \\ i_c \end{bmatrix} + \begin{bmatrix} L_{ph} & M & M \\ M & L_{ph} & M \\ M & M & L_{ph} \end{bmatrix}\frac{d}{dt}\left(\begin{bmatrix} i_a \\ i_b \\ i_c \end{bmatrix}\right) + \begin{bmatrix} e_a \\ e_b \\ e_c \end{bmatrix} \quad (5)$$

When the vector on the left side is represented by V, the vector common to the first and second terms on the right side is represented by I, the matrix of the second term on the right side is represented by L, and the vector of the third term on the right side is represented by E, a following equation (6) is obtained and an equation (7) is obtained by further being modified.

$$V = R_{th}I + L\frac{d}{dt}I + E \quad (6)$$

$$I = \left(R_{th} + L\frac{d}{dt}\right)^{-1}(V-E) \quad (7)$$

Here, the inductance is generalized and represented as shown in an equation (8).

$$[L] = l_s + \begin{bmatrix} L_u & M_{uv} & M_{uw} \\ M_{vu} & L_v & M_{vw} \\ M_{wu} & M_{wv} & L_w \end{bmatrix} \quad (8)$$

$$L_u = \sum_{k=0}^{\infty} L_k \cos 2k\theta$$

$$L_v = \sum_{k=0}^{\infty} L_k \cos 2k\left(\theta - \frac{2\pi}{3}\right)$$

$$L_w = \sum_{k=0}^{\infty} L_k \cos 2k\left(\theta - \frac{4\pi}{3}\right)$$

$$M_{uv} = M_{vu} = \sum_{k=0}^{\infty} M_k \cos 2k\left(\theta - \frac{4\pi}{3}\right)$$

$$M_{vw} = M_{uv} = \sum_{k=0}^{\infty} L_k \cos 2k(\theta)$$

$$M_{wu} = M_{uw} = \sum_{k=0}^{\infty} L_k \cos 2k\left(\theta - \frac{2\pi}{3}\right)$$

Components of the inductance up to a sixth order are exemplified in a following equation (9). As described later, in the present embodiment, feedforward (FF) type control (FF control) is performed. When performing the FF control, the higher-order components of the inductance disappear.

$$[L] = l_s\begin{bmatrix} 0 & 1 & 0 \\ 0 & 1 & 0 \\ 0 & 0 & 1 \end{bmatrix} + L_{g0}\begin{bmatrix} 1 & -\frac{1}{2} & -\frac{1}{2} \\ -\frac{1}{2} & 1 & -\frac{1}{2} \\ -\frac{1}{2} & -\frac{1}{2} & 1 \end{bmatrix} \quad (9)$$

$$- L_{g2}\begin{bmatrix} \cos 2\theta & \cos 2\left(\theta - \frac{4\pi}{3}\right) & \cos 2\left(\theta - \frac{2\pi}{3}\right) \\ \cos 2\left(\theta - \frac{4\pi}{3}\right) & \cos 2\left(\theta - \frac{2\pi}{3}\right) & \cos 2\theta \\ \cos 2\left(\theta - \frac{2\pi}{3}\right) & \cos 2\theta & \cos 2\left(\theta - \frac{4\pi}{3}\right) \end{bmatrix}$$

$$- L_{g4}\begin{bmatrix} \cos 4\theta & \cos 4\left(\theta - \frac{4\pi}{3}\right) & \cos 4\left(\theta - \frac{2\pi}{3}\right) \\ \cos 4\left(\theta - \frac{4\pi}{3}\right) & \cos 4\left(\theta - \frac{2\pi}{3}\right) & \cos 4\theta \\ \cos 4\left(\theta - \frac{2\pi}{3}\right) & \cos 4\theta & \cos 4\left(\theta - \frac{4\pi}{3}\right) \end{bmatrix}$$

$$-L_{g6}\begin{bmatrix} \cos6\theta & \cos6\left(\theta-\frac{4\pi}{3}\right) & \cos6\left(\theta-\frac{2\pi}{3}\right) \\ \cos6\left(\theta-\frac{4\pi}{3}\right) & \cos6\left(\theta-\frac{2\pi}{3}\right) & \cos6\theta \\ \cos6\left(\theta-\frac{2\pi}{3}\right) & \cos6\theta & \cos6\left(\theta-\frac{4\pi}{3}\right) \end{bmatrix}$$

An equation (10) shows E in the equations (6) and (7), taking up to a third harmonic.

$$E = \begin{bmatrix} e_a \\ e_b \\ e_c \end{bmatrix} = \omega\psi_1 \begin{bmatrix} \cos\theta \\ \cos\left(\theta-\frac{2\pi}{3}\right) \\ \cos\left(\theta+\frac{2\pi}{3}\right) \end{bmatrix} + \omega\psi_3 \begin{bmatrix} \cos3\theta \\ \cos3\theta \\ \cos3\theta \end{bmatrix} \quad (10)$$

From the above, the torque equation is obtained as an equation (11).

$$T = \frac{E}{\omega}\left(R_{th} + L\frac{d}{dt}\right)^{-1}(V-E) \quad (11)$$

Here, since the input to the current controller is T and the output from the current controller is V, an equation (12) is obtained by rearranging the equation (11).

$$V = \left(R_{th} + L\frac{d}{dt}\right)\frac{\omega}{E}T + E \quad (12)$$

When performing the feedforward control using the equation (12), the present inventor has studied compensating for parameter variations. In studying the parameters to be compensated, the following assumptions are made. $R_{th}$: Compensate sequentially. L: Use as a fixed value. Note that the inductance does not change with temperature.

Since the equation (12) becomes a target interphase voltage when the three phases are independent of each other, a neutral point voltage $V_N$ is obtained and corrected as follows.

$$V_N = (V_a + V_b + V_c)/3 \quad (13)$$

The phase voltage $V_{an}$ is obtained by a following equation (14).

$$V_{aN} = V_a + V_N \quad (14)$$

From the above, the torque T, the current I, and the voltage V are obtained by equations (15), (16), and (17), respectively. $V_{dutya}$, $V_{dutyb}$ and $V_{dutyc}$ are obtained by an equation (18).

$$\begin{bmatrix} T_{refa} \\ T_{refb} \\ T_{refc} \end{bmatrix} = \begin{bmatrix} \sin(\theta) \\ \sin\left(\theta+\frac{3}{2}\pi\right) \\ \sin\left(\theta-\frac{3}{2}\pi\right) \end{bmatrix} \cdot T_{ref} \quad (15)$$

$$\begin{bmatrix} I_{refa} \\ I_{refb} \\ I_{refc} \end{bmatrix} = \begin{bmatrix} \frac{\omega}{e_a} & 0 & 0 \\ 0 & \frac{\omega}{e_b} & 0 \\ 0 & 0 & \frac{\omega}{e_c} \end{bmatrix} \begin{bmatrix} T_{refa} \\ T_{refb} \\ T_{refc} \end{bmatrix} \quad (16)$$

$$\begin{bmatrix} V_{refa} \\ V_{refb} \\ V_{refc} \end{bmatrix} = \begin{bmatrix} R_{tha}+L_a s & Ms & Ms \\ Ms & R_{thb}+L_b s & Ms \\ Ms & Ms & R_{thc}+L_c s \end{bmatrix} \begin{bmatrix} I_{refa} \\ I_{refb} \\ I_{refc} \end{bmatrix} - \begin{bmatrix} e_a \\ e_b \\ e_c \end{bmatrix} \quad (17)$$

$$\begin{bmatrix} V_{DUTYa} \\ V_{DUTYb} \\ V_{DUTYc} \end{bmatrix} = \begin{bmatrix} V_{refa} \\ V_{refb} \\ V_{refc} \end{bmatrix} + \begin{bmatrix} (V_a+V_b+V_c)/3 \\ (V_a+V_b+V_c)/3 \\ (V_a+V_b+V_c)/3 \end{bmatrix} \quad (18)$$

When performing the feedforward control using the equation (12), the present inventor has studied compensating the self-inductance L. Specifically, the present inventor has compensated for the self-inductance L by using an inverse model, and compensated for a phase delay by an advance component. A calculation of the inverse model is performed by using an abc axis coordinate system instead of a dq axis coordinate system.

Here, when the self-inductance L is compensated by the inverse model, the present inventor has found a problem that noise sensitivity is increased. This is because the processing for compensation becomes a high-pass filter, the sensitivity of the torque sensor system to noise increases, and as a result, the operation noise deteriorates.

Therefore, the present inventor has performed the feedforward control by using a value of a current flowing through a motor to perform various compensations. Specifically, the term of the self-inductance L of the motor M included in the current control block 120a is compensated by the inverse model. Further, a phase characteristic of a transfer function of the inverse model is compensated by the advance component, and a gain characteristic of the transfer function of the inverse model is corrected by a function of a physical quantity obtained based on the angular velocity of the motor. As a result, it is possible to compensate for the phase delay and a gain reduction of a torque output caused by the self-inductance. When compensating for the phase delay and the gain reduction by using the inverse model, it is not essential to provide a disturbance observer to be described next. The feedforward control is possible without providing the disturbance observer.

Next, the observer will be described.

The present inventor has considered compensating current control processing with the disturbance observer using the current command value. This is because the parameter variations of the output are compensated, so that the reduction of the current value noise can be realized.

In the present disclosure, the disturbance observer of an input error model is used. When this observer is used, the feedforward model and the observer model are the same, so that design control is facilitated. The observer model is shown in an equation (19).

$$V_{ab} = \left(R_{th} + \Delta R_{th} + L\frac{d}{dt}\right)I - E \quad (19)$$

In the equation (19), a modeling error between the real and a plant model is represented as $\Delta R_{th}$. As a result, a following equation (20) is obtained.

$$\begin{bmatrix} V_{DUTYa} \\ V_{DUTYb} \\ V_{DUTYc} \end{bmatrix} - \begin{bmatrix} V_{aba} \\ V_{abb} \\ V_{abc} \end{bmatrix} = \begin{bmatrix} \Delta R_{tha} I_a \\ \Delta R_{thb} I_b \\ \Delta R_{thc} I_c \end{bmatrix} \quad (20)$$

Accordingly, $\Delta R_{tha}$, $\Delta R_{thb}$, $\Delta R_{thc}$ can be obtained by dividing each component on the right side of the equation (20) by each component of the detected current $I=(I_a, I_b, I_c)$.

In the equation (20), the $V_{DUTYa}$ to $V_{DUTYc}$ on the left side are the respective voltage command values of the PWM signals for the U, V, and W-phases of the voltage-duty converter 180.

In implementation, the noise sensitivity to $\Delta R$ estimation is considered, the $\Delta R_{th}$ is determined based on a noise-processed signal, and an internal model of the feedforward controller is adapted. That is, a common simple adaptive control system is configured. In this case, since a control target satisfies a condition to be strictly proper, stability of the adaptive control system is guaranteed.

Although the above equation is a representation in the time domain, it can be converted to a representation in the s domain by performing Laplace transform on both sides. In the representation of the s domain, a differential element is replaced by "s". As a result, the control blocks and the coupling relationship between the control blocks illustrated in FIG. 4 is represented by the above equation.

When the current value falls below a constant value, for example, when the current value falls within a range of zero±a threshold value, the observer block 134a may calculate using the previous compensation value. When the current value becomes zero or substantially zero, the voltage is saturated, so that the observer block 134a cannot estimate the disturbance $R_{th}$. Accordingly, the compensation can be performed normally by using the previous compensation value when the value becomes a constant value near zero.

Next, a modification of the exemplary embodiment of the present disclosure will be described.

Figure 5:
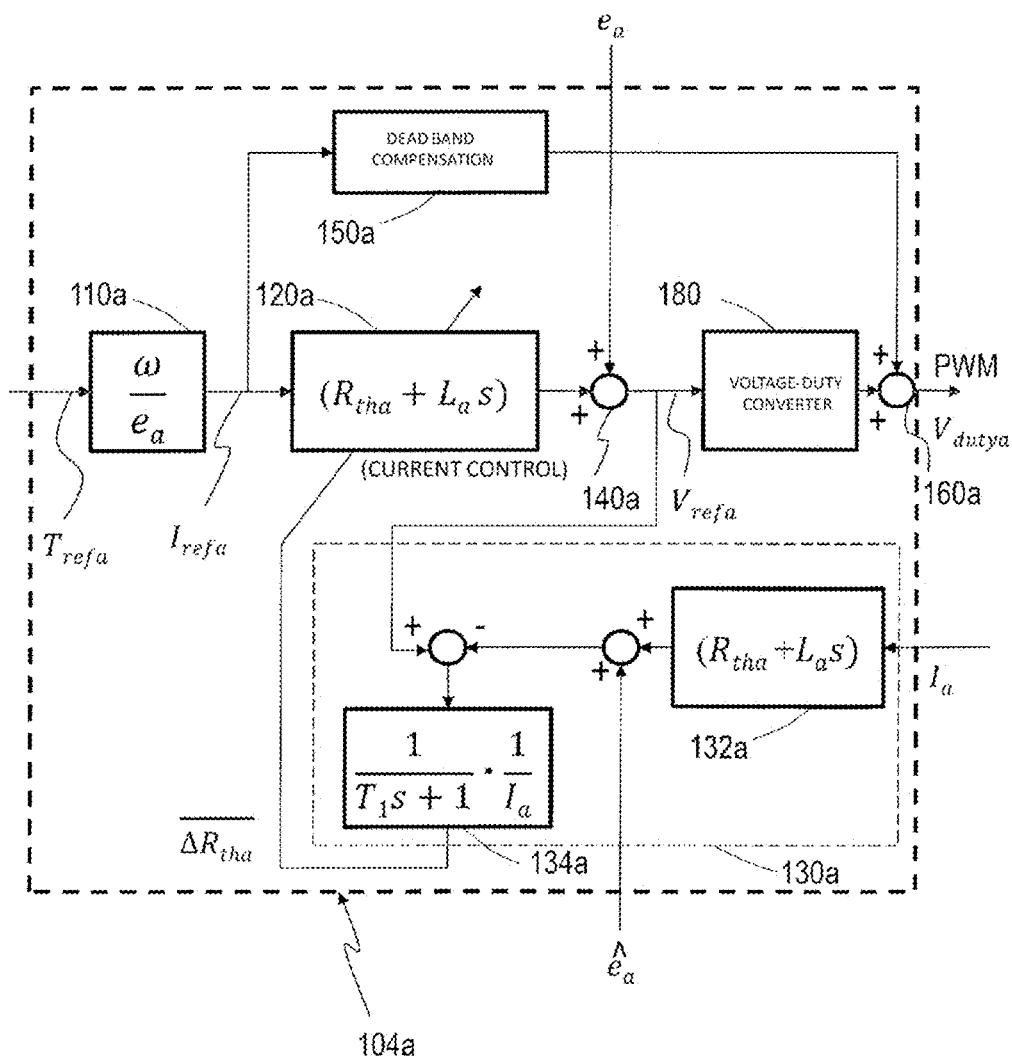
FIG. 5 is a diagram illustrating a configuration of a U-phase processing circuit 104a according to a modification.

FIG. 5 illustrates a configuration of a U-phase processing circuit 104a according to the modification. A configuration of the U-phase processing circuit illustrated in FIG. 5 differs from the configuration of the U-phase processing circuit illustrated in FIG. 4 in that a dead band compensation block 150a and an adder 160a are added. Other configurations and operations are the same. Accordingly, the dead band compensation block 150a and the adder 160a will be described below. For the description of the other components, the description so far is cited.

A "dead band" as referred to hereinafter means a time period in which a current cannot flow even though the current is intended to flow. The dead band is a concept including a time at which no current flows, that is, a dead time at which the current value is zero, and a period at which the current value is rising or is falling from zero. The latter "period" refers to a time period in which substantially the current is considered to be substantially zero. The "dead band" arises from a relationship between a non-linear element of a drive system and electromagnetic compatibility (EMC). The EMC is ability of an apparatus or system to provide no electromagnetic interference wave to interfere with the operation of device or the like to anything, and to withstand interference from an electromagnetic environment so as to satisfactorily function. The non-linear element of the drive system in the present embodiment indicates the dead band set for preventing an arm short circuit.

Here, a case where the motor M is driven by an electric power steering system will be considered as an example.

When a torque ripple is generated in the motor M, a driver feels sound or vibration. For example, assuming that an output of the motor M is 80 Nm, a person feels sound or vibration unless the torque ripple is set to be less than 0.2 Nm. Such a quantization noise becomes a significant problem in applications requiring accuracy, such as an electric power steering. Therefore, in the electric power steering system, it is required to appropriately compensate for a response of the non-linear elements of the drive system, such as the observer block 134a, the drive circuit 200, and the like, so as to reduce the vibration and the operation noise as much as possible. The present inventor has studied to perform compensation of the non-linear elements of the drive system in consideration of the dead band.

In the present modification, the dead band compensation block 150a calculates the compensation value of the non-linear element of the drive system based on the dead band compensation value. The dead band of the motor drive circuit is generated at the zero crossing point of the current. The dead band compensation block 150a outputs a duty value corresponding to the dead band at the timing at which the motor current crosses zero. The "duty value corresponding to the dead band" may be fixed, or may be varied under a predetermined condition.

The adder 160a adds the duty value at the timing at which the motor current crosses zero, and the duty value corresponding to the dead band. Accordingly, it is possible to control with fewer parameters with respect to the feedforward control while realizing a low operation noise.

A timing at which the current crosses zero can be estimated. According to the exemplary embodiment of the present disclosure, $I_{refa}$, $I_{refb}$, and $I_{refc}$, which are intermediate outputs of the feedforward controller, correspond to the estimated values of the current. The dead band compensation block 150a and the adder 160a can perform dead band compensation by a following equation using the output.

$$\text{IF } I_{refn} \cong 0 \text{ THEN } V_{DUTY} + \text{sign}(I_{refn})\text{Duty}_{dead} \quad (21)$$

An IF clause in the equation (21) is not $I_{refn}=0$. That is, when the motor current is within a predetermined range that can be considered to be virtually zero, then it can be regarded as "zero crossing". In the description, in addition to the case where the zero crossing is actually performed, the case where it can be regarded as the zero crossing is also collectively referred to as the "zero crossing".

In the method of the present modification, since the noise level of the signal used for the dead band compensation is low, it is not necessary to perform a limit cycle vibration prevention measure, and it is expected that the dead band can be guaranteed with high accuracy.

In addition, since the timing at which the current crosses zero is estimated by using the intermediate output of the FF type controller, an estimation model and an FF type controller model can be matched with each other. Accordingly, it is possible to reduce the order of the controller. Further, by independently controlling the three phases, the dead band of the drive circuit can be efficiently compensated.

When compensating for the dead band, it is not essential to provide the disturbance observer described above. The feedforward control is possible without providing the disturbance observer.

Next, application of the above-described embodiment and modification will be described.

Figure 6:
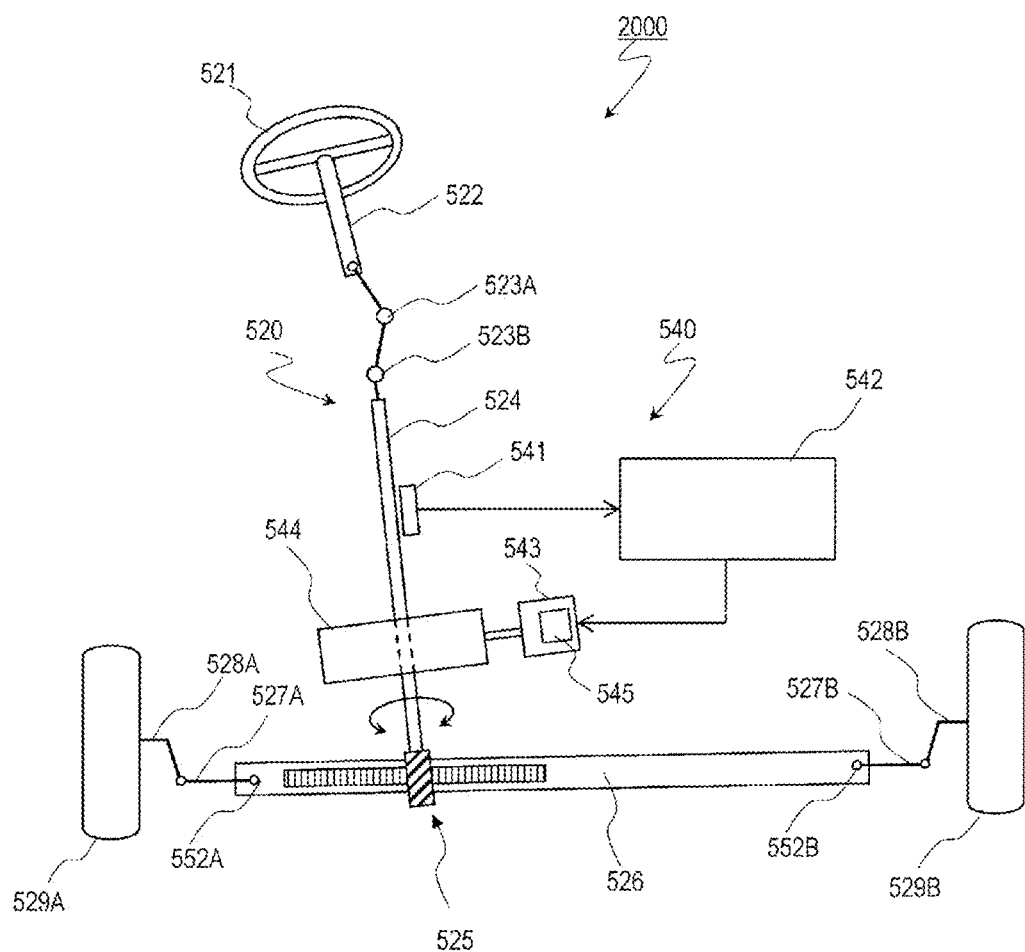
FIG. 6 schematically illustrates a typical configuration of an EPS system 2000 according to an exemplary embodiment.

FIG. 6 schematically illustrates a typical configuration of an EPS system 2000 according to an exemplary embodiment.

Vehicles such as automobiles normally have an EPS system. The EPS system 2000 includes a steering system 520 and an auxiliary torque mechanism 540 for generating auxiliary torque. The EPS system 2000 generates the auxiliary torque that assists steering torque of the steering system generated by a driver operating a steering wheel. With the auxiliary torque, an operation burden of the driver is reduced.

The steering system 520 includes, for example, a steering wheel 521, a steering shaft 522, universal joints 523A, 523B, a rotary shaft 524, a rack and pinion mechanism 525, a rack shaft 526, right and left ball joints 552A, 552B, tie rods 527A, 527B, knuckles 528A, 528B, and right and left steered wheels 529A, 529B.

The auxiliary torque mechanism 540 includes, for example, a steering torque sensor 541, an electronic control unit (ECU) for an automobile 542, a motor 543, and a deceleration mechanism 544. The steering torque sensor 541 detects the steering torque in the steering system 520. The ECU 542 generates a drive signal based on a detection signal from the steering torque sensor 541. The motor 543 generates the auxiliary torque corresponding to the steering torque based on the drive signal. The motor 543 transmits the generated auxiliary torque to the steering system 520 via the deceleration mechanism 544.

The ECU 542 includes, for example, the controller 100, drive circuit 200, and the like described above. In an automobile, an electronic control system with the ECU as a core is constructed. In the EPS system 2000, a motor control system is constructed by, for example, the ECU 542, the motor 543, and an inverter 545. As the motor control system, the above-described motor control system 1000 can be suitably used.

The embodiment of the present disclosure is also suitably used in motor control systems of an X-by-wire such as a shift-by-wire, steer-by-wire, brake-by-wire and the like, and a traction motor and the like that require torque angle estimation capability. For example, the motor control system according to the embodiment of the present disclosure may be mounted on an automated vehicle that complies with a level 0 to 4 (automation criterion) defined by the Japanese government and the National Highway Traffic Safety Administration (NHTSA).

The embodiment of the present disclosure may be widely used in various devices including various motors such as a vacuum cleaner, a dryer, a ceiling fan, a washing machine, a refrigerator, an electric power steering device, and the like.

The invention claimed is:

1. A controller used in a motor control system for driving a motor by using a drive circuit and an inverter, the controller comprising:
    a current control block, wherein
    feedforward control by using a current value is performed;
    a term of a self-inductance of the motor included in the current control block is compensated by an inverse model;
    a phase characteristic of a transfer function of the inverse model is compensated by an advance component; and
    a phase delay and a gain reduction of a torque output generated by the self-inductance is compensated by correcting a gain characteristic of the transfer function of the inverse model by a function of a physical quantity obtained based on an angular velocity of the motor.

2. The controller according to claim 1, further comprising:
    a disturbance observer for performing feedforward control by using a current value, wherein
    a disturbance parameter of the current control block is compensated by adaptive control by using an output value of the disturbance observer.

3. The controller according to claim 1, further comprising:
    a dead band compensation block for determining a timing at which a dead band of the drive circuit is generated and outputting a dead band compensation value; and
    an adder for adding a duty value at the timing and the dead band compensation value to generate a PWM signal.

4. A motor control system comprising:
    a motor;
    a controller according to claim 1;
    a drive circuit for generating a control signal from the PWM signal output from the controller; and
    an inverter for performing a switching operation based on the control signal to allow a current to flow through the motor.

5. The motor control system according to claim 4, wherein the motor is a motor having 10 poles and 12 slots or 14 poles and 12 slots.

6. An electric power steering system comprising the motor control system as claimed in claim 4.

7. The motor control system according to claim 4, further comprising a housing integrally accommodating the motor, the controller, the drive circuit, and the inverter.

* * * * *